May 19, 1931.  D. H. EASTERLY  1,806,243
HAYSTACKER
Filed Jan. 2, 1929   3 Sheets-Sheet 1

Inventor
David H. Easterly
By Lancaster and Allurie
Attorney

May 19, 1931.  D. H. EASTERLY  1,806,243
HAYSTACKER
Filed Jan. 2, 1929  3 Sheets-Sheet 2
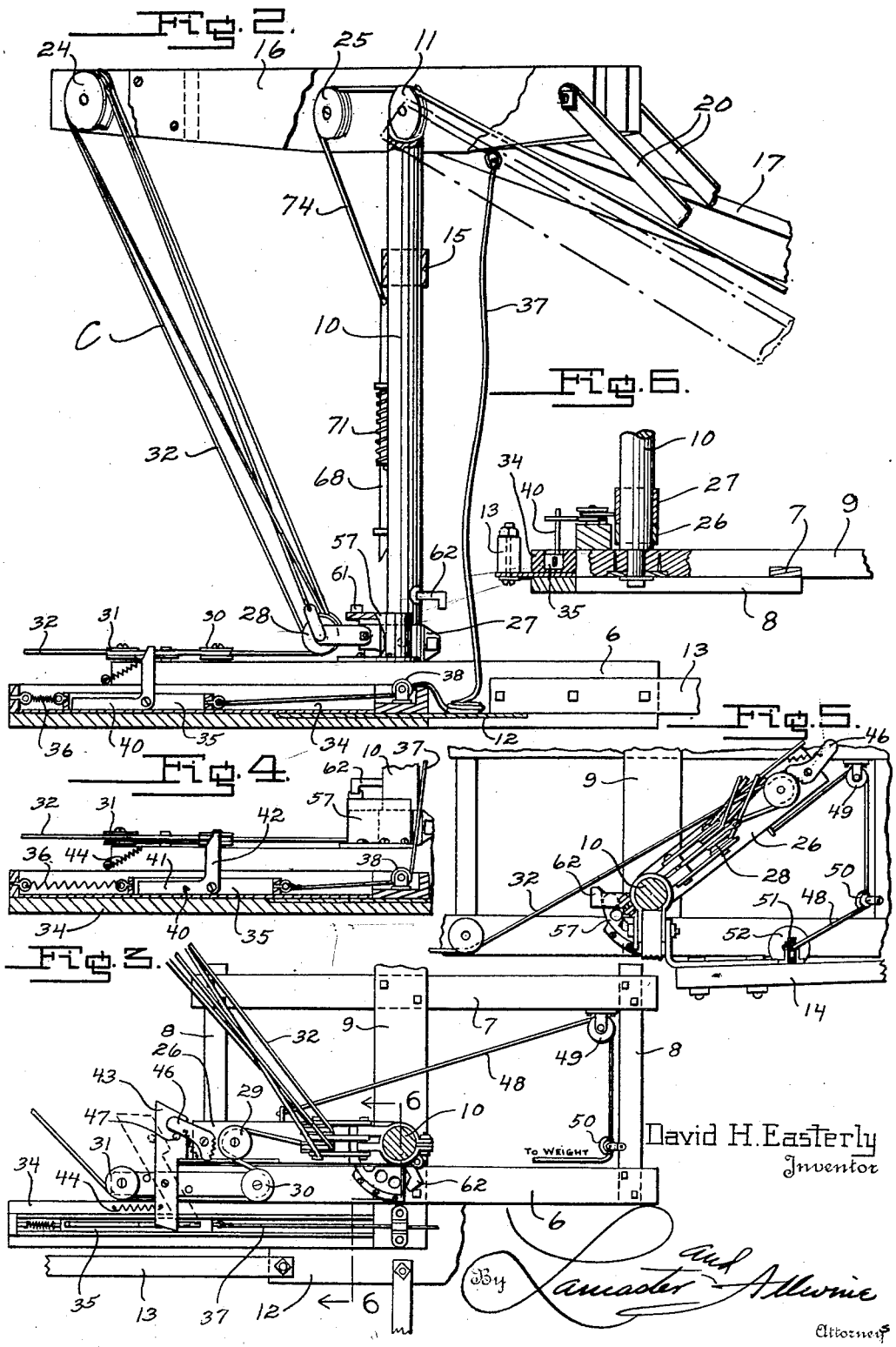

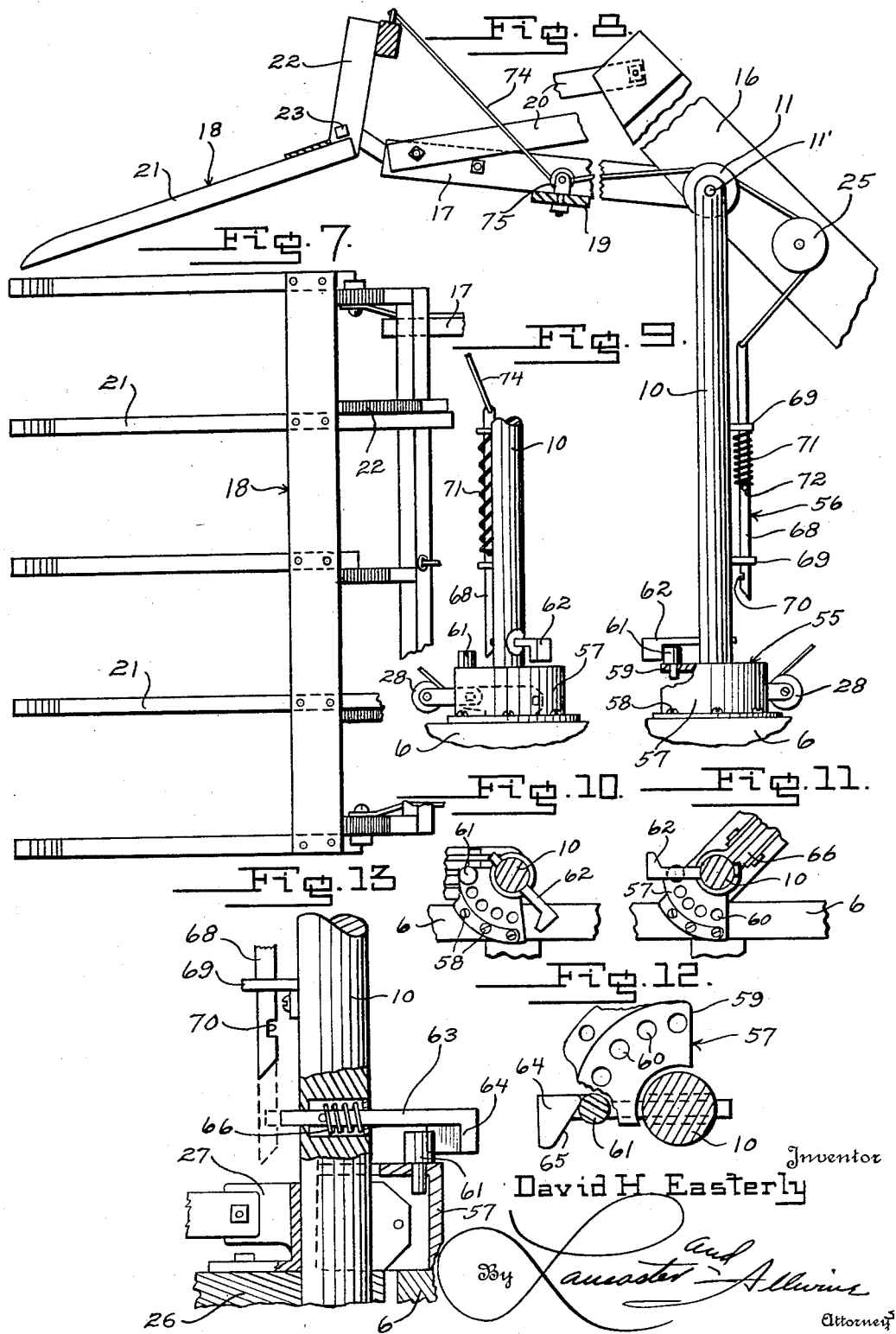

Patented May 19, 1931

1,806,243

UNITED STATES PATENT OFFICE

DAVID H. EASTERLY, OF DETROIT, MICHIGAN

HAYSTACKER

Application filed January 2, 1929. Serial No. 329,843.

The present invention relates to hay stackers and the primary object of the invention is to provide a hay stacker of the swinging type which will be automatic in the degree of elevating and swinging of the hay rack from its lower loading position.

A further object of the invention is to provide an automatic hay stacker of the swinging type embodying means for automatically swinging and dumping the hay rack after the rack has been elevated to a predetermined height.

A further object of the invention is to provide an automatically operating hay stacker of the swinging type embodying means for automatically swinging the elevated load of hay, with adjustable means for limiting the swinging movement of the hay rack and release of the hay therefrom at predetermined points.

A still further object of the invention is to provide an automatic hay stacker embodying weight operated means for swinging the hay rack, with means for automatically permitting swinging movement of the hay rack by the weight means after the hay rack has been elevated to a predetermined elevation.

A still further object of the invention is to provide an automatic hay stacker of the swinging type including an automatic trip means for the hay rack wherein the fingers of the rack will be retained in a horizontal position until release of the rack by the trip means.

Other objects and advantages of the invention will be apparent during the course of the following detailed description, taken in connection with the accompanying drawings forming a part of this specification and in which drawings:

Figure 2 is a fragmentary view part in vertical section and part in elevation and showing the parts in position after the hay rack has been tripped.

Figure 3 is a fragmentary horizontal section taken above the base frame or platform and showing the control arm in it latched position during raising of the rack.

Figure 4 is a fragmentary section thru the slide of the adjustable release means for the control arm and showing the trigger having been moved for releasing the control arm latch.

Figure 5 is a fragmentary horizontal section showing the manner in which the control arm is swung by the weight means for swinging the hay rack.

Figure 6 is a fragmentary vertical section on the line 6—6 of Figure 3.

Figure 7 is a top plan view of the hay rack.

Figure 8 is a fragmentary detail view showing the trip rod release for allowing tilting of the hay rack for discharging the hay therefrom.

Figure 9 is a fragmentary detail view showing the trip rod held in its lowered position for retaining the fingers of the hay rack horizontally.

Figure 10 is a fragmentary detail view of the adjustable release means.

Figure 11 is a fragmentary detail view showing the manner in which the trip rod release pin engages the adjustable release pin for allowing upward movement of the trip rod.

Figure 12 is an enlarged fragmentary view looking at the under side of the adjustable release means and showing more clearly the manner in which the trip rod release pin will be withdrawn by the adjustable retracting pin.

Figure 13 is an enlarged fragmentary section showing the manner in which the trip rod release pin is mounted to extend thru the center post or mast.

Figure 1:
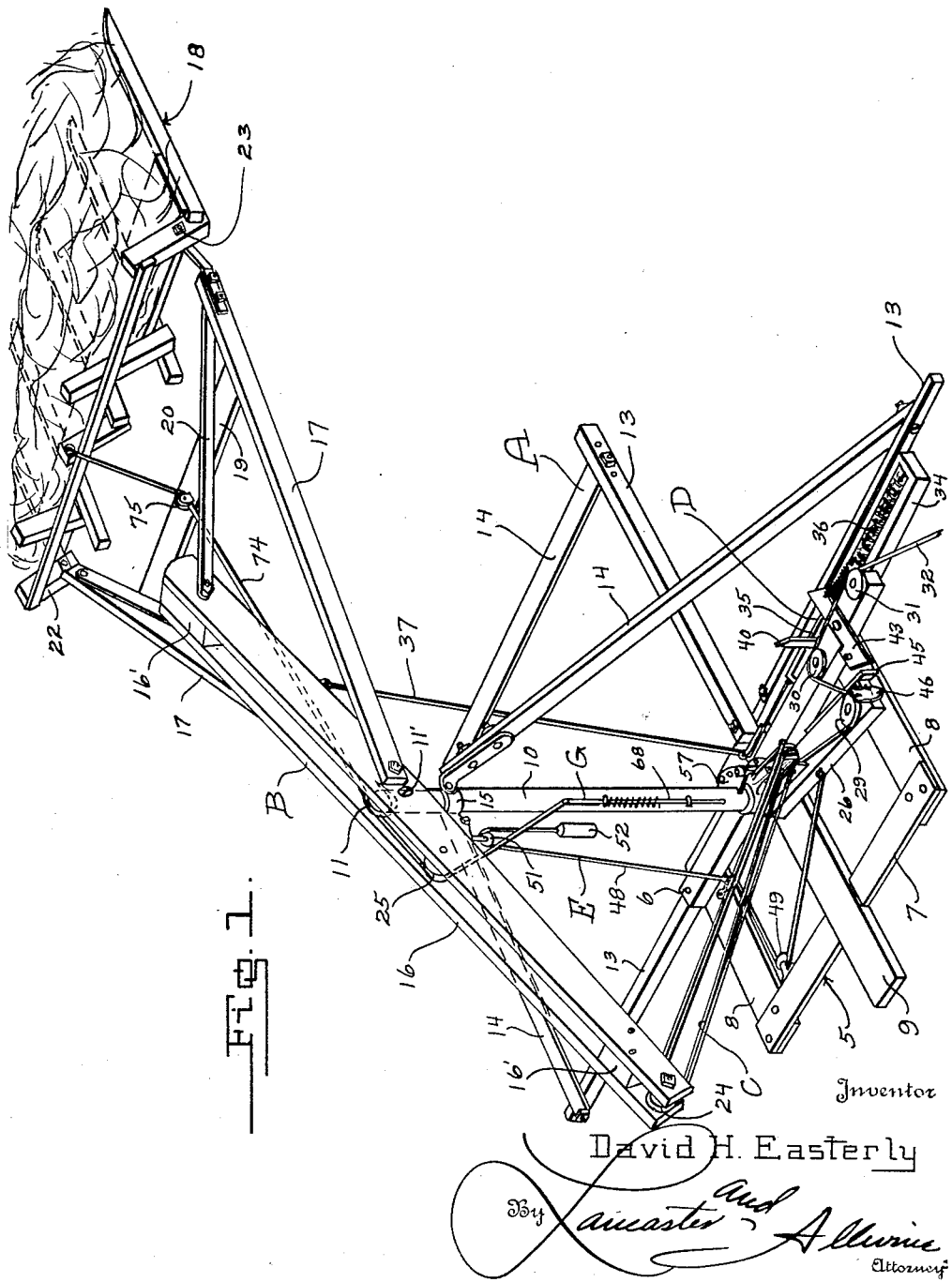
Figure 1 is a perspective view of the improved hay stacker and showing the relation of parts just after the control arm has been released by upward movement of the hay rack to allow horizontal swinging of the rack by the gravity operated swinging means.

Referring to the drawings in detail, and wherein similar reference characters designate corresponding parts thruout the several views, the letter A designates a supporting structure for mounting of the stacker proper B; C hoist or lift means for vertical movement of the stacker proper B, D adjustable control means for the lift means C to permit horizontal swinging of the stacker B by the swinging means E, and G adjustable automatic trip means for allowing tilting of the hay receiving rack at predetermined positions of horizontal swinging movement of the stacker proper.

The supporting structure A embodies a base frame or platform 5 providing a truck or sled for the stacker and is formed with front and rear longitudinal sills 5 and 6 respectively, connected at their ends by the end cross rails or sills 8 and at their medial portions by a central cross sill 9 the ends of which preferably project beyond the side sills 6 and 7. Revolubly mounted at its lower end upon the central cross sill 9 immediately rearwardly of the front longitudinal sill 6 is a center post or mast 10 which is preferably of cylindrical formation in cross formation and carries at its upper end a suitable pulley or sheave 11 mounted to revolve about a horizontal axis. The frame 5 also includes an anchor plate 12 to which is secured the ends of horizontal brace members 13 which are arranged at angles of 90 degrees to one another with two of the brace members extending longitudinally of the front sill 6 and the intermediate brace member extending in longitudinal alignment with the central cross sill 9. These horizontal brace members 13 are intended to rest upon the ground surface, and mounted at one end to the outer end of each of the horizontal brace members 13 is a diagonal brace member 14. The inner ends of the diagonal brace members 14 are anchored to a suitable collar 15 which encircles the mast 10 adjacent the upper end of the mast and in which collar the mast is free to rotate.

The stacker proper B for pivotal mounting upon the upper end of the mast 10 embodies a walking beam 16 which may be formed from a pair of suitably heavy rails held separated by the spacer blocks 16' arranged adjacent each end of the beam. The beam 16 is pivotally mounted intermediate its ends upon the pivot pin 11' for the sheave 11 with the rails of the beam spaced one at each side of the mast 10 so that the ends of the beam will have vertical swinging movement. Thus it will be seen that the vertical swinging axis of the beam 16 is at the axis of rotation of the sheave 11. Extending forwardly in diverging relation and anchored at their rear ends to the sides of the beam 16 adjacent its pivotal axis, is a pair of arms 17 to the forward ends of which is pivotally mounted a hay rack 18. The forward diverging ends of the arms 17 are preferably connected by a transverse tie member 19, and connected with the forward end of the beam 16 are lift arms 20 which have their forward ends anchored to the forward ends of the arms 17. The hay rack 18 is of substantially L-shape in formation forming a base portion composed of the fingers 21 and the upstanding back posts 22. The forward end of each arm 17 carries a suitable bracket having its outer end pivotally connected as at 23 to the lower end of the terminally disposed back posts 22 so that the hay rack is pivotally mounted at its rear lower portion for vertical tilting upon the forward ends of the arms 17. Mounted between the rails of the walking beam 16 at the rear end thereof, is a double pulley or sheave 24, while mounted between the beam rails rearwardly of the pivotal mounting 11' of the beam is a single sheave 25.

Referring now to the hoist or lift means for vertical swinging movement of the stacker proper B, the same includes a horizontally swinging control arm 26 which is fixedly secured at its inner end to the lower end of the mast 10 as by a clamp bracket 27 clamped about the mast. The bracket 27 carries a set of pulleys 28 of any approved type for cooperating with the pulleys 24 carried by the rear end of the walking beam 16. Mounted upon the upper side and at the outer end of the arm 26 is a sheave 29 which rotates about a vertical axis. Mounted to rotate about a vertical axis upon one end of the front frame sill 6 is a pair of pulleys 30 and 31 with the pulley 31 preferably mounted upon the extreme end of the sill and the pulley 30 mounted at a location on the sill nearer to the mast 10 than the spacing of the pulley 29 from the mast. A hoist or lift rope 32 is connected at one end to the anchoring bracket 27 and is trained over the pulleys 24 and 28, and from one of the pulleys 28 is trained outwardly around the pulley 29 and then about the pulleys 30 and 31 in a manner as clearly illustrated in Figures 1 and 3 so that when a pull is exerted on the rope or cable the rear end of the beam 16 will be moved downwardly for elevating the hay rack 18. The reason for so locating the pulleys 29 and 30 in the specific relation as shown in Figure 3 will be subsequently explained. Any suitable draft means such as horses, a tractor, or a suitable power plant may be applied for exerting the required pull on the rope or cable 32 for elevating the load of hay deposited on the rack 18. In Figure 3 is shown the position of the control arm 26 with respect to the sill 6 during elevating of the hay rack by the hoist means C.

The adjustable control means D embodies a channeled guide rack 34 secured to extend longitudinally of the front side of the front longitudinal frame rail 6 with the outer end of the rack projecting beyond the pulleys 30 and 31. Mounted for longitudinal sliding movement in the channel of the guide rack 34 is a slide block 35 to the outer end of which is attached one end of a contractile coil spring 36 having its opposite end anchored to the outer end of the guide rack for normally urging the slide block longitudinally in the guide rack away from the mast 10. Connected with the inner end of the block 35 is a control cable 37 which is trained about a suitable sheave 38 mounted upon the forward end of the central frame rail 9 and then extends upwardly for attachment at its upper end to the walking beam 16 at a location substantially midway between the forward end and pivotal axis of the beam. Thus it will be seen that upon upward swinging of the forward end of the walking beam a pull will be exerted on the control cable 37 and cause the slide block 35 to be moved longitudinally in the guide rack 34 toward the sheave 38. Carried by the slide block 35 is an L-shaped trigger 40 which is pivotally mounted at its elbow so that when the longer leg 41 of the trigger rests horizontally in the slide block the arm 42 of the trigger will extend vertically upwardly with its upper end projecting above the upper surface of the frame sill 6.

Mounted intermediate its ends upon the upper side of the frame sill 6 between the pulleys 30 and 31 so that the ends thereof extend forwardly and rearwardly of the sill, is a latch arm 43. The forward end of the latch arm 43 projects above the channel in the guide rack 34 and is intended to be engaged by the upstanding arm portion 42 of the trigger 40 for swinging the latch arm when the slide block is drawn inwardly toward the pulley 38 by the control cable 37. A retaining spring 44 is connected with the forward end of the latch arm for normally urging the rear end of the arm toward the mast 10. As the slide block 35 moves away from the pulley 38 the upstanding trigger arm 42 will engage the forward end of the latch arm 43 and cause the trigger to be rocked about its pivotal axis so that the arm 42 may readily pass the latch arm.

Carried by and projecting from the end of the control arm 26 is a latch plate 45 which is adapted to engage behind the hooked end of the latch arm 43 for normally retaining the control arm in a position extending longitudinally along the rear edge of the frame sill 6. The rear edge of the latch arm 43 is beveled as clearly shown for allowing the latch plate to readily swing the rear end of the latch arm so that the latch plate may readily swing into position behind the shoulder on the latch arm.

Pivotally mounted upon the upper side of the control arm 26 beyond the pulley 29 is a grip pawl 46 having a toothed arcuate edge adapted to impinge the rope 32 against the periphery of the pulley 29 when the pawl is swung in one direction. The arm portion of the pawl extends beyond the end of the control arm 26 and is intended to be engaged by an upstanding pin or projection 47 carried by the latch arm 43 whereby when the arm 26 is in its normal position against the frame rail 6, the pin 47 will act to retain the toothed edge of the pawl 46 out of engagement with the hoist rope 32. A suitable coil spring as shown in Figure 3 may be provided for normally urging the toothed edge of the grip pawl 46 toward the pulley 29. With the elements in a position as shown in Figure 3, it will be seen that the grip pawl 46 is held in its inoperative position for allowing the hoist cable 32 to freely pass about the pulley 29.

The swinging means E for swinging the stacker proper horizontally after the same has been raised to a predetermined elevation by the hoist means C, includes a swinging cable 48 which is anchored at one end to the horizontally swinging control arm 26 and extends therefrom about a pulley 49 arranged on the rear sill 7 adjacent the opposite end of the base frame upon which the latch arm 43 is disposed. From the pulley 49 the cable extends forwardly about a pulley 50 and then upwardly over a pulley 51 hung from the upper end of one of the diagonal brace members 14. A weight 52 is suspended by the cable 48, and by observing Figure 1 it will be seen that the action of the weight 52 will exert a pull on the control arm 26 and cause the mast 10 to be rotated for horizontally swinging the hay rack 18. In Figure 5 will be seen the limit of horizontal movement of the control arm 26 by the weight operated swinging means E.

Referring now to the automatic trip means G for allowing tilting of the hay rack 18 at predetermined positions of horizontal swinging movement of the stacker proper B, the same includes an adjustable release means 55 and a return means 56 which when released by the means 55 permits tilting of the rack 18 and then returns the rack to its normal load receiving position.

Referring first to the release means 55, the same includes a gauge block or member 57 which is rigidly mounted upon the upper side of the frame rail 6 as by suitable fastening elements 58 at a location thereon whereby the segmental shaped top plate 59 partially encircles the mast 10. This segmental shaped top plate 59 is provided with a series of arcuately arranged openings 60 for removably receiving the stem portion of the trip pin 61, and which trip pin is preferably provided with a cylindrical shaped head. The series of openings 60 are arranged in a circle concentric to the axis of the mast 10, and the trip pin 61 is readily removable for positioning in either of the apertures 60. A release pin 62 intended to engage the trip pin 61, includes a stem portion 63 which extends diametrically thru the mast 10 directly above the segmental top plate 59, and provided at one end of the stem 63 is a cam head 64 provided at its inner side with a cam face 65 which engages the cylindrical head of the trip pin 61 for causing the release pin to be moved longitudinally thru the mast 10. An expansion coil spring 66 encircles the stem 63 preferably within the mast 10 and acts in a manner as will readily be apparent from Figure 13 to normally urge the cam head 64 toward the mast so that one end of the stem is normally held projected. When the release pin 62 is swung thru rotation of the mast 10 it will be seen that the cam head 64 will engage the trip pin 61 and cause the projecting end of the stem 63 to be retracted from a holding position with the return means 56.

The return means 56 includes a vertically movable trip rod 68 mounted in suitable guide brackets 69 carried by the mast 10. The trip rod 68 is preferably of square or rectangular shape in cross section for preventing rotation of the rod in the guide brackets 69. The lower end of the rod 68 is beveled, and provided at the inner face of the rod, and at that face confronting the mast 10, is a notch 70 for receiving the end of the release pin stem 64 when the trip rod is in its normal lowered position. An expansion coil spring 71 encircles the trip rod 68 between the brackets 69 with one end of the spring acting upon the uppermost bracket and the lower end of the spring acting upon a pin 72 on the trip rod whereby the spring acts to normally urge the trip rod downwardly to be engaged by the release pin 62. Connected at one end to the upper end of the trip rod 68 is a trip cable 74 which extends first over the sheave or pulley 25 and then over the pulley 11 and beneath a suitable sheave 75 mounted at the central portion of the cross rail 19 and has attachment at its forward end with the upper edge of the back portion of the hay rack 18. By observing Figure 8 it will be seen that when a pull is exerted on the trip cable 74 that the back posts 22 of the hay rack will be swung rearwardly about the pivot 23 for elevating the rack triggers 21. With the trip rod 68 in its lower latched position as shown in Figure 9, and in which position the rack 18 is in a condition for receiving a load of hay, it will be seen that thru rotation of the mast 10 for horizontally swinging the stacker proper B, that the release pin 62 will engage the trip pin 61 and be retracted for releasing the trip rod so that the weight of the hay on the hay rack will tilt the rack about the pivot 23 and cause the trip rod spring 71 to be compressed. After the hay has slid off the hay rack fingers the spring 71 will return the rack to its normal position thru the cable 74 and move the trip rod downwardly so that the same will be engaged at its lower end by the trip rod release pin 62 for holding the hay rack in its load receiving position.

In operation of the improved automatic stacker, and with the control arm 26 in its normal latched position as shown in Figure 3, the rack 18 is in its lowered position upon the ground to receive a load of hay to be stacked. The trip pin 61 is then placed in the desired opening 60 for determining the position at which it is desired to have the hay dumped from the rack and the control cable 37 has been adjusted in length for determining the elevation to which the rack will be raised before being swung horizontally by the means E. Power is then applied to the hoist rope 32 which causes the hay rack to be raised to the desired elevation and takes the slack out of the control cable 37 so that the slide block 35 is drawn toward the pulley 38. As the slide block 35 is so moved longitudinally the upstanding arm portion 42 of the trigger 40 engages the forward end of the latch arm 43 and so swings the latch arm as to swing the latch arm free of its holding engagement with the latch plate 45 for freeing the control arm 26. As the latch arm 43 is swung away from the latch plate 45 the grip pawl 46 is freed from the pin 47 and the teeth of the pawl impinge the rope 32 between the pawl and pulley 29 so that the hay rack is held against being lowered by the weight of the load of hay thereon. The force acting upon the hoist rope is then relieved and the weight 52 connected by the cable 48 to the control arm 26 will cause the control arm to be swung for rotating the mast 10 and consequent horizontal swinging of the rack 18.

As the mast 10 is being rotated by the swinging means E, the release pin 62 will engage the trip pin 61 and release the trip rod 68 so that the weight of the load on the rack 18 will cause the rack to be tilted for depositing the hay at the desired location. Immediately upon release of the load from the hay rack the spring 71 will depress the rod 68 so that the rod is again engaged by the pin 62 with the hay rack returned to its normal position. After the load has been dumped from the rack 18 a pull is again exerted on the rope 32 whereby the arm 26 will be swung to its normal position and be engaged by the latch arm 43 with the grip pawl 46 being released by its engagement with the pin 47. The hoist rope 32 is then again slackened for allowing lowering of the hay rack, and which lowering of the rack will permit the control cable 37 to slacken for allowing the slide block 35 to be retracted by the spring 36.

By so having the pulleys 29 and 30 so mounted in a relation as shown, such will allow for slight swinging movement of the control arm 26 after being released from the latch arm 43 and enables the grip pawl 46 to properly impinge the hoist rope before the pulling power upon the rope is released. It is thought to be readily apparent from Figure 3 the manner in which the control arm 26 is permitted to swing horizontally away from the frame rail 6 by allowing the length of rope between the pulleys 29 and 30 to extend substantially at a right angle to the rail 6 while power is still applied to the hoist rope.

By so having the pulley 25 located rearwardly of the pulley 11, such acts upon the trip cable 74 as to retain the rack fingers 21 in a horizontal position thru vertical movement of the rack and thus prevent the load from sliding off the rack.

From the foregoing description it will be seen that an improved construction for hay stackers of the swinging type has been provided which will be automatic in its swinging and dumping operations and thus eliminating the necessity of requiring a separate operator for performing the dumping operation. It will also be apparent that a novel arrangement has been provided wherein predetermined limited vertical movement of the hay rack acts thru suitable mechanism to permit automatic horizontal swinging of the hay rack to predetermined positions whereupon the load is automatically dumped and the rack automatically returned to its load receiving position.

Changes in detail may be made to the form of invention herein shown and described, without departing from the spirit of the invention or the scope of the following claims.

I claim:

1. A hay stacker comprising a supporting structure including a rotatable mast, a control arm rigidly connected at one end to the lower end of the mast, a beam pivotally mounted intermediate its ends upon the upper end of the mast, a rack pivotally mounted forwardly of the mast for vertical swinging movement therewith, a hoist rope connected with the rear end of the beam for imparting vertical swinging movement thereto, latch means engageable with the control arm, means for releasing the latch means upon limited vertical movement of the rack, means for swinging said control arm when released to rotate said mast, and means for automatically tripping said rack at predetermined positions of horizontal swinging movement of the rack.

2. The combination with a hay stacker embodying a supporting structure including a rotatable mast, and a stacker proper pivotally supported upon the upper end of the mast for vertical swinging movement and including a pivoted rack, of means for imparting vertical swinging movement to the stacker proper, a control arm projecting radially from the mast latch means engageable with the arm for normally preventing rotation of the mast, release means for said latch including a control cable connected at one end to the stacker proper, weight operated means for rotating said mast upon release of the latch means, and means for automatically tripping the rack at predetermined positions of horizontal swinging movement of the stacker proper.

3. The combination with a hay stacker comprising a supporting structure including a rotatable mast, and a stacker proper pivotally supported upon the upper end of the mast for vertical swinging movement and including a pivoted rack, of lift means for imparting vertical swinging movement to the stacker proper, a control arm rigidly connected at one end to the lower portion of the mast, releasable latch means engageable with the control arm for preventing rotation of the mast, gravity actuated means connected with the control arm to impart swinging movement thereto for rotating the mast, and automatically operable trip means for said rack.

4. The combination with a hay stacker comprising a supporting structure including a rotatable mast, and a stacker proper pivotally supported on the mast for vertical swinging movement and including a pivoted rack, of a hoist rope for imparting vertical swinging movement to the stacker proper, latch means for normally preventing rotation of the mast, means for releasing the latch means upon predetermined positions of vertical swinging movement of the stacker proper, a grip pawl engageable with the hoist rope for preventing lowering of said rack and normally held disengaged from the hoist rope by the latch means, means for automatically rotating the mast upon release of the latch means, and means for automatically tripping the rack at predetermined positions of horizontal swinging movement of the stacker proper.

5. The combination with a hay stacker comprising a supporting structure including a rotatable mast, and a stacker proper pivotally supported upon the upper end of the mast for vertical swinging movement and including a pivoted rack, of lift means for imparting vertical swinging movement to the stacker proper, a control arm connected to the lower portion of the mast, a pivoted latch arm releasably engageable with the control arm for preventing rotation of the mast, release means for the latch including a control cable having one end connected to the stacker proper, gravity actuated means connected with the control arm for swinging the same to rotate said mast, and trip means for allowing tilting of said rack including a trip rod automatically releasable at predetermined positions of horizontal swinging movement of the stacker proper.

6. The combination with a hay stacker comprising a supporting structure including a rotatable mast, a beam pivotally mounted on the upper end of the mast, a rack pivotally supported upon one end of the beam, and hoist means for imparting vertical swinging movement to the beam, of means for automatically swinging and tripping said rack embodying a control arm rigidly connected at one end to the lower portion of the mast, latch means releasably engageable with the arm for normally preventing swinging movement thereof, a trigger member for releasing said latch, a control cable connected to the trigger member and having its opposite end connected to said beam for operating the trigger member upon limited upward swinging of the rack, means for automatically rotating the mast upon release of the control arm, and trip means for automatically releasing said rack at predetermined positions of horizontal swinging movement of the beam and embodying means for automatically returning the rack to its normal position.

7. The combination with a hay stacker comprising a supporting structure including a rotatable mast, a beam pivotally mounted on the upper end of the mast, a rack pivotally supported upon one end of the beam, and hoist means for imparting vertical swinging movement to the beam, of latch means for normally preventing rotation of the mast, weight operated means for rotating the mast upon release of the latch means, and trip means for the rack including an adjustable trip pin, a longitudinally movable trip rod, a release pin engageable with the trip rod and releasable by the trip pin, a trip cable connecting the trip rod and said rack, and spring means for returning the trip rod and rack to their normal positions with the trip rod engaged by the trip pin.

8. The combination with a hay stacker comprising a supporting structure including a rotatable mast, a beam pivotally mounted on the upper end of the mast, a rack pivotally supported upon one end of the beam, and hoist means for imparting vertical movement to the beam, of latch means for normally preventing rotation of the mast, means for releasing the latch means upon predetermined positions of vertical movement of the beam, means for rotating the mast, a fixed gauge member having a series of openings concentric to the axis of rotation of the mast, a trip pin removably insertable into either of said openings, a release pin slidable transversely thru the mast and having a cam head engageable with the trip pin for imparting longitudinal movement to the release pin, a trip rod mounted for longitudinal sliding movement upon the mast to be releasably engaged by said release pin, a trip cable connecting the upper end of the trip rod and said rack to permit tilting of the rack when the trip rod is released, and spring means acting upon the trip rod for returning the trip rod and said rack to their normal positions.

DAVID H. EASTERLY.